US006577226B1

(12) United States Patent
Steiner

(10) Patent No.: US 6,577,226 B1
(45) Date of Patent: Jun. 10, 2003

(54) SYSTEM AND METHOD FOR AUTOMATIC VEHICLE UNLOCK INITIATED VIA BEAM INTERRUPTION

(75) Inventor: Wesley Dean Steiner, Fort Wayne, IN (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/300,415

(22) Filed: Apr. 27, 1999

(51) Int. Cl.[7] .......... B60R 25/10

(52) U.S. Cl. .......... 340/5.62; 340/5.72; 340/10.34; 340/426

(58) Field of Search .......... 340/5.72, 426, 340/10.34, 10.1, 10.5, 5.61, 5.62, 5.63, 555, 556, 557, 545.7, 545.3; 307/10.5, 117; 180/287; 250/221; 327/47

(56) References Cited

U.S. PATENT DOCUMENTS 3,605,082 A * 9/1971 Matthews .......... 340/556
3,891,980 A * 6/1975 Lewis et al. .......... 340/10.5
4,471,343 A * 9/1984 Lemelson .......... 307/10.5
4,688,036 A 8/1987 Hirano et al.
4,738,334 A * 4/1988 Weishaupt .......... 180/287
4,794,268 A 12/1988 Nakano et al.
4,811,013 A 3/1989 Akutsu
4,942,393 A 7/1990 Waraksa et al.
5,319,364 A 6/1994 Waraksa et al.
5,379,033 A 1/1995 Fujii et al.
5,682,135 A 10/1997 Labonde
5,790,014 A * 8/1998 Campbell et al. .......... 340/10.34
5,808,544 A * 9/1998 Kani et al. .......... 340/426
5,929,769 A * 7/1999 Garnault .......... 340/5.61
5,973,611 A * 10/1999 Kulha et al. .......... 340/5.62
6,031,465 A * 2/2000 Burgess .......... 340/5.54
6,034,617 A * 3/2000 Luebke et al. .......... 340/5.62
6,075,294 A * 6/2000 Van den Boom et al. . 307/10.1
6,094,131 A * 7/2000 Chen et al. .......... 340/426

FOREIGN PATENT DOCUMENTS

DE 4212291 A1 10/1993
DE 19639896 A1 4/1998
DE 29623461 U1 9/1998
DE 19813782 C1 5/1999
EP 0735219 A1 10/1996
FR 2772818 6/1996
FR 2749607 12/1997

* cited by examiner

*Primary Examiner*—Edwin C. Holloway, III
(74) *Attorney, Agent, or Firm*—Tarolli, Sundheim, Covell & Tummino L.L.P.

(57) ABSTRACT

An entry system (10) and an associated method are provided for a vehicle (12) that has at least one securable entrance. A lockable entrance cover (18, e.g., a door) closes the entrance to the vehicle (12). An interrogation communication arrangement has components (26 and 36) at the vehicle (12) and at an authorized person (14). The interrogation communication arrangement is operable for communicating and causing automatic lock release of said entrance cover (18). A beam interrupt sensor assembly (40) provides a beam (48) of energy and causes operation of the communication arrangement when the beam is interrupted.

14 Claims, 4 Drawing Sheets

SYSTEM AND METHOD FOR AUTOMATIC VEHICLE UNLOCK INITIATED VIA BEAM INTERRUPTION

FIELD OF THE INVENTION

The present invention relates to passive vehicle entry systems, and specifically related to systems that cause unlocking as an authorized person is about to actuate a handle.

BACKGROUND OF THE INVENTION

Passive vehicle entry systems are known. Such systems permit automatic unlocking of a vehicle door, or the like, for an authorized person wishing to gain entry into the vehicle. Specifically, the authorized person does not need to manually turn a key in a vehicle lock, manually actuate a hand-held transmitter, or manually input a code onto a vehicle touch pad.

A passive system includes an identification transceiver carried on the authorized person and a base transceiver located at the vehicle. The base transceiver interrogates the identification transceiver, and in response to the interrogation, the and in response to the interrogation, the identification transceiver outputs a signal that conveys an appropriate security code. In response to reception of the signal conveying the security code, the base transceiver unlocks the vehicle door. Thus, the authorized person may simply operate a door handle and open the door. Such systems are often referred to as radio frequency identification (RFID) systems, or contact-less identification and authentication systems.

One issue that exists is that output of the interrogation signal from the base transceiver at the vehicle requires power consumption. Transmission of the interrogation signal is only required when the authorized person is intending to enter the locked vehicle. Thus, for a vehicle locked and left unintended in a parking lot, transmission of the interrogation signal is unnecessary for a rather long length of time.

It is known in the art to control transmission of the interrogation signal such that the interrogation signal is transmitted only at a time when the person is intending to enter the locked vehicle. One example of such a system is set forth in U.S. Pat. No. 5,682,135 in which movement of a person's hand adjacent to a door handle is detected via a passive infrared receiver array. As the hand of the person moves within the vicinity of the handle, a series of pulses are output from the receiver array. The series of pulses is interpreted by a microprocessor, which in turn activates a vehicle base transponder.

SUMMARY OF THE INVENTION

In accordance with one aspect, the present invention provides an entry system for a vehicle that has at least one securable entrance. A lockable entrance cover closes the entrance to the vehicle. Interrogation communication means, which has components at the vehicle and at an authorized person, is operable for communicating and causing automatic lock release of the entrance cover. Beam means provides a beam of energy and causes operation of the communication means when the beam is interrupted.

In accordance with another aspect, the present invention provides an entry system for a vehicle that has at least one securable entrance. A movable entrance cover closes the entrance to the vehicle. The entrance cover has a latch mechanism for holding the entrance cover in a closed position, a manually operable handle for causing the latch mechanism to release the entrance cover from the closed position, and a lock mechanism for preventing release of the entrance cover from the closed position. First transceiver means, at the vehicle, is operable for emitting an interrogation signal and for receiving a response signal. Control means, at the vehicle and operatively connected to the first transceiver means and the lock mechanism, controls the lock mechanism to permit release of the entrance cover upon determination of receipt of an authorized response signal. Second transceiver means, carried by a person authorized to access the vehicle, receives the interrogation signal and emits the authorized response signal in response to receipt of the interrogation signal. Beam emitter means, located adjacent to the handle of the entrance cover, emits a beam of electromagnetic energy. Beam receiver means, located adjacent to the handle of the entrance cover and positioned such that the beam emitted from the beam emitter means can impinge upon the beam receiver means, outputs a signal, indicative of whether the beam is blocked from impinging upon the beam receiver means, that controls operation of the first transceiver means.

In accordance with another aspect, the present invention provides a method for automatically actuating a lock mechanism to permit release of an entrance cover that closes an entrance into a vehicle. A beam is provided that extends adjacent to an actuation handle for the entrance cover. The beam is interrupting while reaching to actuate the handle. The beam interruption is detected. An interrogation signal is emitted from the vehicle in response to the detected beam interruption. The interrogation signal is received at a transceiver located at a person authorized to access the vehicle. An authorized response signal emitted in response to receipt of the interrogation signal. The response signal is received at the vehicle. The lock mechanism is actuated to an unlock condition in response to receipt of the response signal.

BRIEF DESCRIPTION OF THE DRAWINGS

The foregoing and other features and advantages of the present invention will become apparent to those skilled in the art to which the present invention relates upon reading the following description with reference to the accompanying drawings, wherein.

DEVELOPMENTS OF PREFERRED EMBODIMENTS

Figure 1:
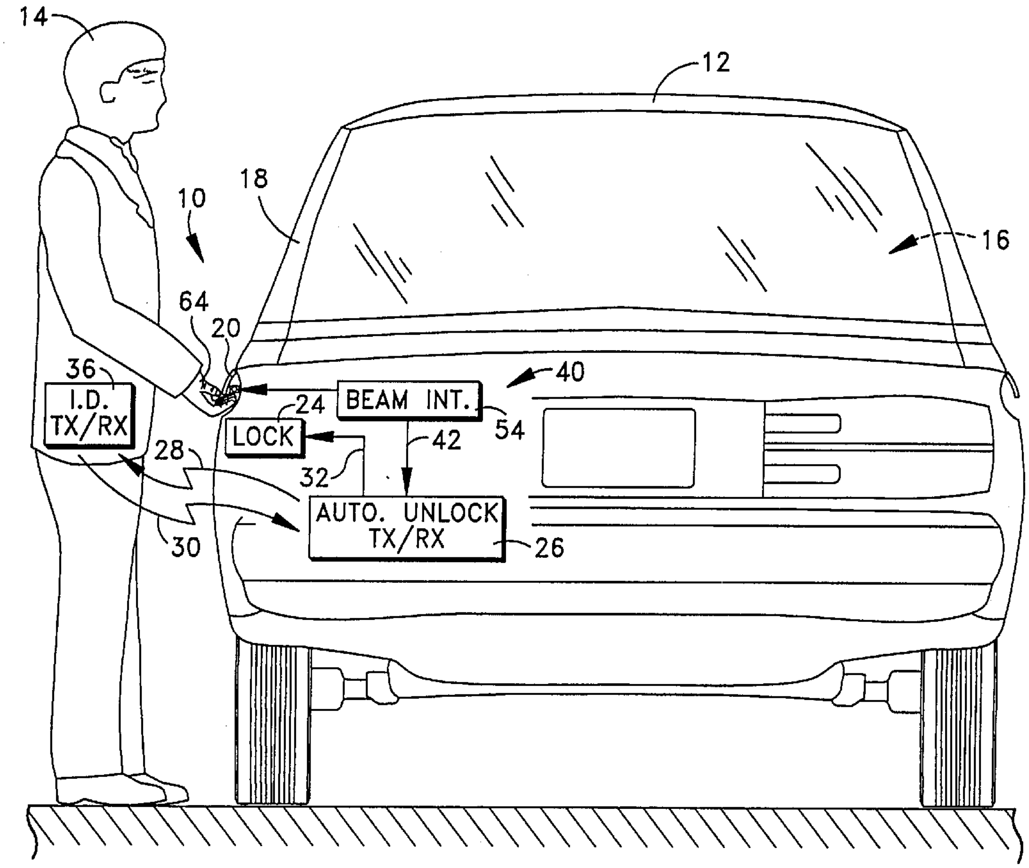
FIG. 1 is a block diagram of a system in accordance with the present invention, and an associated vehicle and an authorized person.
Figure 2:
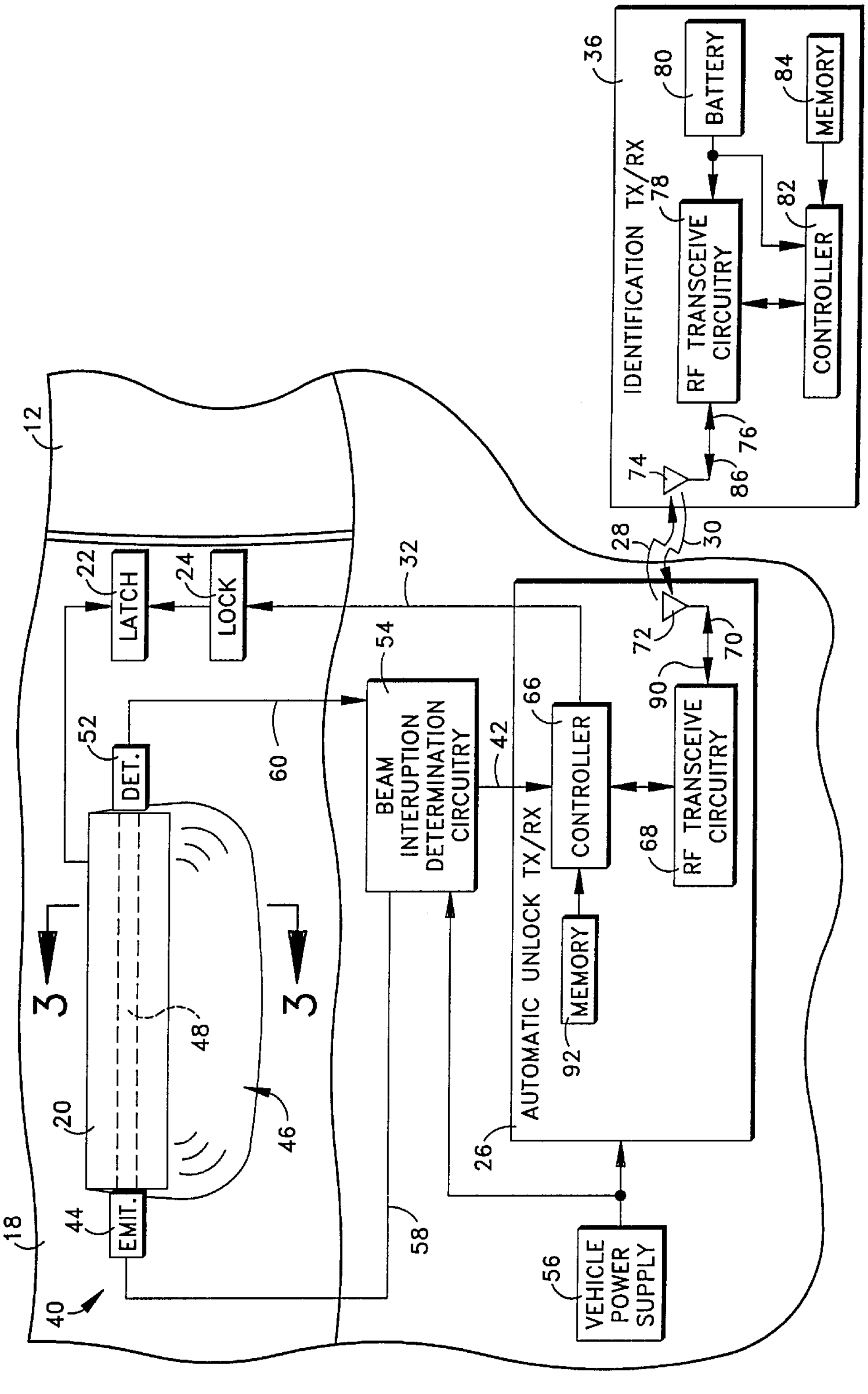
FIG. 2 is a detailed block diagram of the system of FIG. 1, and a door portion of the vehicle.

A system 10, in accordance with the present invention, along with an associated vehicle 12 and an authorized person 14 are shown in FIG. 1. The vehicle 12 includes an interior 16 that is enclosed by at least one access door 18. The door 18 is movable and has a handle 20 that is manually actuatable by the person 14 to cause actuation of a latch mechanism 22 (FIG. 2). Latch mechanism actuation releases the door to open, such that the person 14 (FIG. 1) may gain entrance into the interior 16 of the vehicle 12. In broad terms, the door 18 is an entrance cover that closes an entranceway into the vehicle interior 16. A lock mechanism 24 (FIG. 2) maintains the latch mechanism 22 in a latched condition and prevents opening of the door 18. The person of ordinary skill in the art should appreciate that any of numerous types and configurations of latch mechanisms and lock mechanisms can be employed for the system 10.

The system 10 (FIG. 1) includes an automatic unlock transceiver 26 located at the vehicle 12. The automatic unlock transceiver 26 emits a radio frequency (RF) interrogation signal 28 and also receives a RF response signal 30. The automatic unlock transceiver 26 is operatively connected 32 to the lock mechanism 24, and controls operation of the lock mechanism.

An identification transceiver 36 is located on the authorized person 14. The identification transceiver 36 may take the form of a button or tag that the person carries in their pocket or purse, or secured to their key chain. The identification transceiver 36 receives the interrogation signal 28, and in response to reception of the interrogation signal, emits the response signal 30. The response signal 30 conveys an appropriate security code, which identifies the bearer of the identification transceiver 36 as the person that is authorized to enter the vehicle 12.

In response to reception of the response signal 30, the automatic unlock transceiver 26 provides a signal to the lock mechanism 24 that causes actuation to an unlock condition. Thus, the person 14 can gain entry to the interior 16 of the vehicle 12 without manually operating any unlock device, such as manually turning a key, manually operating a hand-held transmitter, or manually entering a code on a touch pad at the vehicle, or the like. In broad terms, the automatic unlock transceiver 26 and the identification transceiver 36 are a communication arrangement for performing the interrogation and automatic unlock sequence for the authorized person 14.

In accordance with the present invention, the automatic unlock transceiver 26 does not continuously output the interrogation signal 28. A beam interrupt sensor assembly 40 provides a signal 42 to the automatic unlock transceiver 26 to cause transmission of the interrogation signal 28. A beam emitter 44 (FIG. 2) of the assembly 40 is located adjacent to the handle 20 on the door 18.

The emitter 44 is located at one side (the left side is shown in FIG. 2) of the handle 20, and at a position behind and/or beneath the handle area. Thus, the emitter 44 is protected from environmental conditions and the emitter is not exposed to direct sunlight. The emitter 44 is fixed relative to the door 18. In one embodiment, at least a portion of the emitter 44 is located beneath the outer metal skin of the door adjacent to a recess area 46 of the metal skin. An aperture is provided in the metal skin and the emitter 44 is affixed at the aperture in the metal such that a beam 48 emitted from the emitter is directed into the recess area 46 behind/beneath the handle 20.

Preferably, the emitter 44 is an infrared emitter and the emitted beam 48 is an infrared beam. Also preferably, the beam 48 is directed along a path that is parallel to the length of the handle 20. However, it is to be appreciated that the emitter 44 may be designed to emit another type of beam energy. Also, another beam path may be provided (e.g., another relationship to the handle and/or including a reflection).

A beam detector 52 of the assembly 40 is located adjacent to the handle 20 of the door 18 and at the side of the handle opposite to that of the emitter 44 (the right side as shown in FIG. 2). The detector 52 is located behind/beneath the handle area, thus the detector is protected from environmental conditions and is not exposed to direct sunlight. The detector 52 is fixed relative to the door 18. In one embodiment, at least a portion of the detector 52 is located beneath the outer metal skin of the door adjacent to the recess area 46 of the metal skin. An aperture is provided in the metal skin and the detector 52 is affixed at the aperture in the metal such that the beam 48 emitted from the emitter 44 can impinge upon the detector.

The detector 52 is of the type that detects impingement of the beam that is emitted from the emitter 44. Thus, the detector 52 is preferably an infrared detector.

The emitter 44 and the detector 52 are connected to beam interruption determination circuitry 54. This circuitry 54, along with the automatic unlock transceiver 26, is powered by a vehicle power supply 56 (e.g., a vehicle battery and regulation circuitry). The beam interruption determination circuitry 54 provides a power signal 58 to energize the emitter 44. When the emitter 44 is energized and the beam 48 is output, a detector output signal 60 is monitored to determine if the beam 48 is impinging upon the detector 52.

When a hand 64 (FIG. 3) of the person 14 reaches into the recess area 46 to grasp the handle 20, the fingers of the hand block the beam 48. The interruption of the beam 48 causes the detector output signal 60 (FIG. 2) to change. Accordingly, the beam interruption determination circuitry 54 provides the signal 42 indicative of the beam interruption to the automatic unlock transceiver 26.

Within the automatic unlock transceiver 26, the signal 42 is provided to a controller 66. In response to the signal 42 from the beam interruption determination circuitry 54, the controller 66 activates RF transceive circuitry 68. Upon activation, the RF transceive circuitry 68 provides a stimulus electrical signal 70 to an antenna 72, and the antenna emits the interrogation signal 28. Example frequencies for the signal 28 include 125 kHz, 134.2 kHz, and 13.56 MHz.

At the identification transceiver 36, an antenna 74 receives the interrogation signal 28 and outputs an electrical signal 76 to RF transceive circuitry 78. In the embodiment shown in FIG. 2, a battery 80 powers the RF transceive circuitry 78 and the other components of the identification transceiver 36. The RF transceive circuitry 78 conveys an interrogation request message to a controller 82. In response to the interrogation request, the controller 82 accesses an identification security code from a memory 84.

The controller 82 assembles a response signal message containing the security code, and provides the message to the RF transceive circuitry 78. An electrical signal 86 conveying the response message is output from the RF transceive circuitry 78 to the antenna 74. In response to the stimulus of the electrical signal 86, the antenna 74 outputs the response signal 30.

The response signal 30 is received by the antenna 72 at the automatic unlock transceiver 26. An electrical signal 90 is output from the antenna 72, which conveys the contents of the response message to the RF transceive circuitry 68. The response message is conveyed from the RF transceive circuitry 68 to the controller 66. Within the controller 66, the security code provided via the response signal 30 is compared with a security code stored within a memory 92 of the automatic unlock transceiver 26.

If the security codes match, the controller 66 provides a signal via the connection 32 to the lock mechanism 24 that causes the lock mechanism to unlock. Thus, when the person 14 (FIG. 3) operates (i.e., lifts up on) the handle 20, the door 18 is opened without the person having performed a manual unlock procedure.

The sensing of the beam interruption, transmission of the interrogation signal 28, transmission of the response signal 30, and unlocking of the door 18 occur within a sufficiently short time period such that a perceived delay in unlocking does not occur. Thus, as the person 14 reaches into the door handle recess area 46 and prior to lifting of the handle 20, the door is automatically unlocked.

Further, the transmission of the interrogation signal 28 only occurs when the beam 48 is interrupted, and beam interruption occurs when the person is about to operate the door 18 to gain entry into the vehicle 12. Thus, undue power drain caused by transmission of the interrogation signal 28 does not occur.

Figure 4:
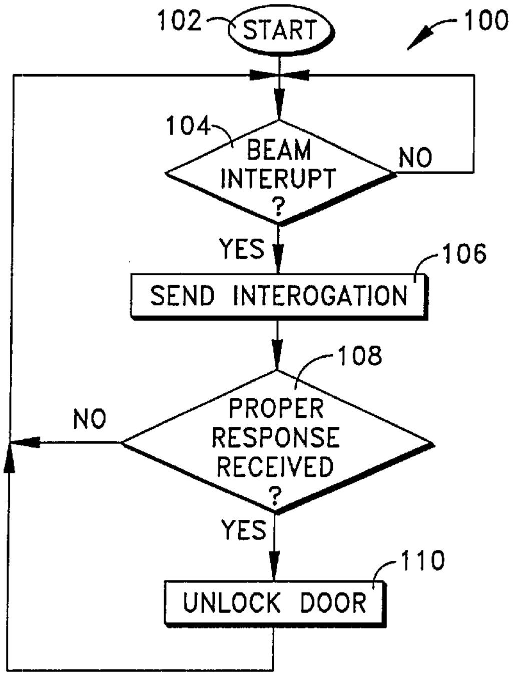
FIG. 4 is a flow chart for a process performed within an automatic unlock transceiver shown in FIG. 2.

FIG. 4 is a flow chart for a process 100 performed within the automatic unlock transceiver 26 shown in FIG. 2. The process 100 (FIG. 4) begins at step 102 and proceeds to step 104 in which it is determined whether the beam 48 is interrupted. If the determination at step 104 is negative (i.e., the beam 48 is not interrupted), step 104 is repeated while the controller 66 waits for the signal 42 that indicates that the beam is interrupted.

Upon an affirmative determination at step 104 (i.e., the beam 48 is interrupted), the process 100 goes to step 106 and the controller 66 causes the RF transceive circuitry 68 and antenna 72 to provide the interrogation signal 28. At step 108, it is determined whether a proper response signal 30 is received. This entails a two-fold determination as to whether any response signal is received within a certain time period, and whether the response signal conveys the correct security code.

If the determination at step 108 is negative (i.e., the proper response signal 30 is not received), the process 100 goes from step 108 to step 104. However, if the determination at step 108 is affirmative (i.e., the proper response signal 30 is received), the process 100 goes from step 108 to step 110. At step 110, the controller 66 causes unlocking of the door 18. Upon completion of step 110, the process 100 returns to step 104.

Figure 3:
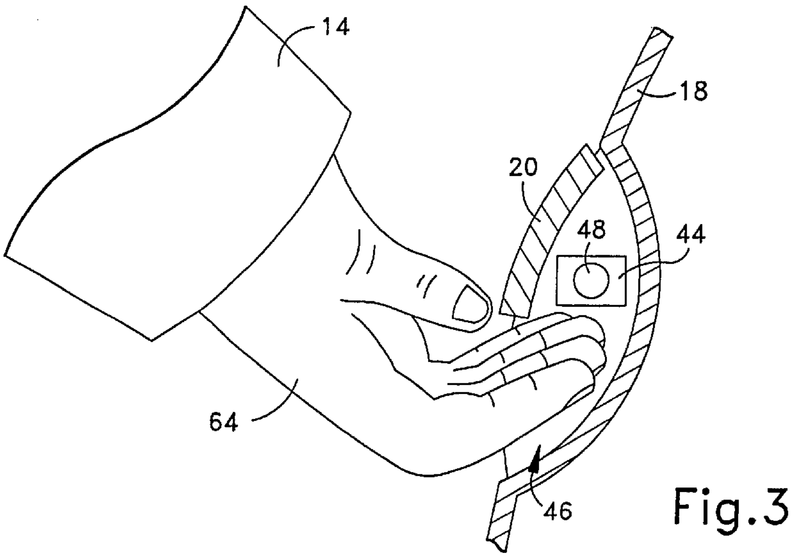
FIG. 3 is a view taken along line 3—3 of FIG. 2, and also shows an added portion of a hand of the person of FIG. 1.
Figure 5:
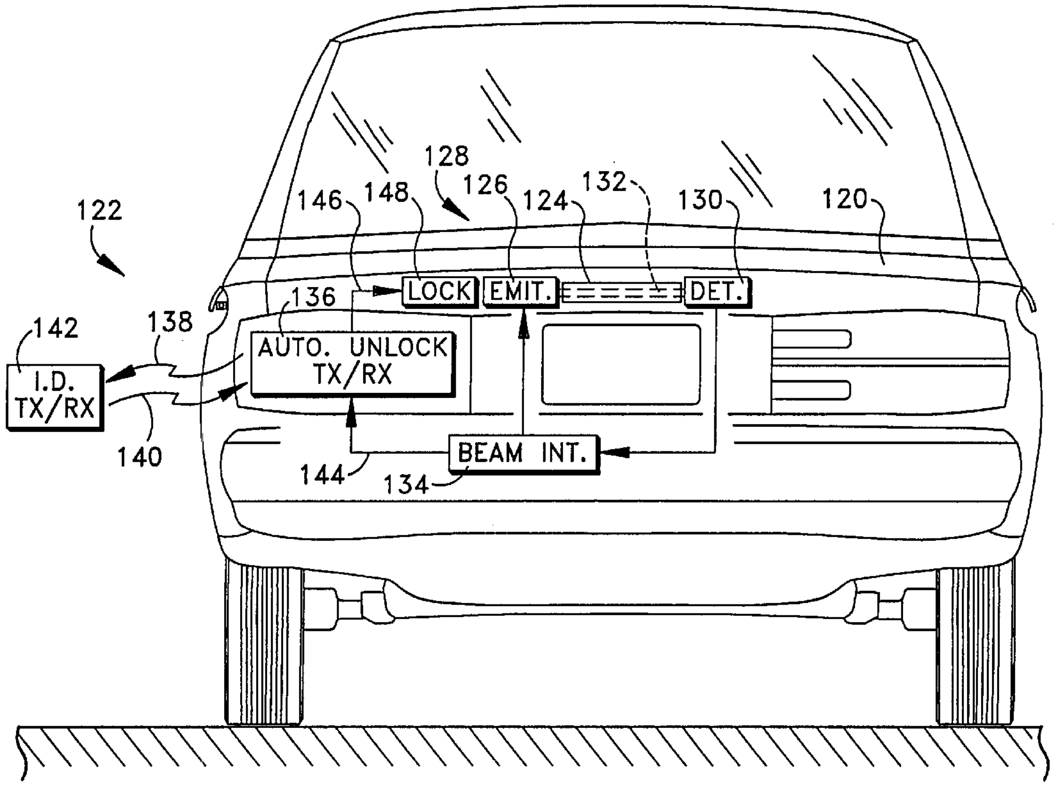
FIG. 5 is a block diagram of another embodiment of the present invention, and also shows a trunk area of an associated vehicle.

The first embodiment shown in FIGS. 1–3 is described in association with a vehicle door. It is to be appreciated that the present invention is applicable to other entranceways into the vehicle 12. For example, the embodiment shown in FIG. 5 is associated with automatic unlocking of a trunk lid 120. In broad terms, the trunk lid 120 is an entrance cover for the entrance into the trunk space.

In a system 122 of FIG. 5, a handle 124 for opening the trunk lid 120 is located on or near the trunk lid. An emitter 126 of a beam interruption sensor assembly 128 is located behind/beneath the handle 124 and to one side of the handle. A detector 130 of the assembly 128 is located behind/beneath the handle, and at the opposite side of the handle as that of the emitter 126. A beam 132 from the emitter 126 to the detector 130 extends behind/beneath the handle 124 in a manner similar to that for the embodiment shown in FIGS. 1–3.

As a person's hand reaches to operate the handle 124, the beam 132 is interrupted and beam interruption determination circuitry 134 provides a signal 144 indicating beam interruption to an automatic unlock transceiver 136. In response to the signal 144, the interrogation exchange (i.e., the communication that includes the interrogation signal 138 and response signal 140) between the automatic unlock transceiver 136 and an identification transceiver 142 is initiated. Upon a determination of receipt of a proper security code via the interrogation, the automatic unlock transceiver 136 provides an unlock signal 146 to a trunk lid lock 148.

Figure 6:
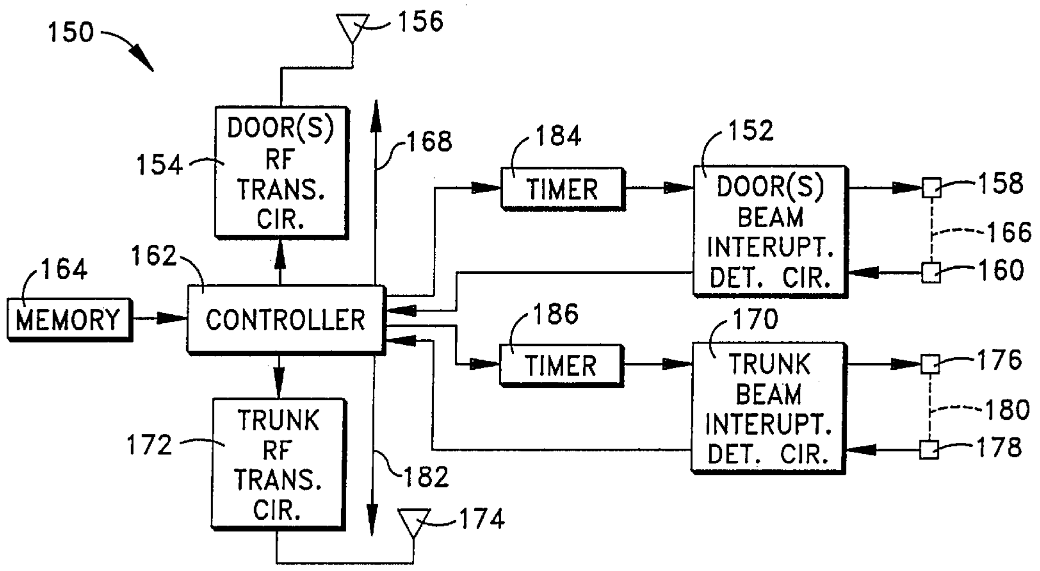
FIG. 6 is a block diagram of yet another embodiment of the present invention.

As a further modification to the previously disclosed embodiments, a system 150 (FIG. 6) controls automatic unlocking at each of a plurality of entranceways (e.g., doors and the like, not shown in FIG. 6) into the vehicle (not shown in FIG. 6). In the example embodiment of FIG. 6, at least one beam interruption detection circuitry 152 is provided for the vehicle door(s). Also, at least one RF transceive circuitry 154 and at least one antenna 156 is associated with the vehicle door(s).

An emitter 158 and a detector 160 are associated with each door handle (not shown in FIG. 6) in a manner similar to that for the embodiment of FIGS. 1–3. It is to be appreciated that separate beam interruption detection circuitry 152 (FIG. 6) may be provided for each emitter and detector 158 and 160, or each emitter/detector pair may be connected to a single beam interruption detection circuitry. An interrogation sequence with an identification transceiver (not shown in FIG. 6) occurs in response to the beam interruption detection circuitry 152 providing a signal to a controller 162 that the beam 166 is interrupted by a person (not shown in FIG. 6) reaching for the associated door handle (not shown in FIG. 6), similar to the embodiment of FIGS. 1–3. Also, similar to the embodiment of FIGS. 1–3, a determination to permit access to the vehicle, via unlocking, is made by comparison of a received security code to a security code in a memory 164 (FIG. 6). If the codes match, the controller 162 provides an unlock signal 168 for the door(s).

It is to be appreciated that the controller 162 can cause unlocking to only occur at the door at which the beam 166 was interrupted. It is to be further appreciated that separate RF transceive circuitry 154 and separate antenna 156 may be associated with each side of the vehicle (or even each vehicle door). Thus, it is contemplated that the controller 162 can cause interrogation to only occur at the side (or the door) at which the beam 166 was interrupted.

Also shown in FIG. 6 are beam interruption detection circuitry 170, RF transceive circuitry 172, and an antenna 174 that are associated with a trunk area (not shown in FIG. 6) in a manner similar to the corresponding structure in the embodiment of FIG. 5. An emitter 176 (FIG. 6) and a detector 178 are associated with a trunk lid handle (not shown in FIG. 6) in a manner similar to that for the embodiment of FIG. 5.

An interrogation sequence with an identification transceiver (not shown in FIG. 6) occurs in response to the beam interruption detection circuitry 170 providing a signal to the controller 162 that a beam 180 is interrupted by a person (not shown in FIG. 6) reaching for the trunk lid handle, similar to the embodiment of FIG. 5. Upon successful interrogation (i.e., the codes match), the controller 162 (FIG. 6) provides an unlock signal 182 for the trunk.

It is to be appreciated that the interrogation at the trunk area is independent of the interrogations at the doors. In other words, an interrogation at the trunk does not cause interrogation at the doors, and vice versa. Thus, the single controller 162 controls interrogation for each of the various types of entrances (e.g., doors and trunk lid) of the vehicle.

As yet another modification shown within the embodiment of FIG. 6, the beams 166 and 180 used to detect a person reaching for a handle need not be ON continuously. Specifically, the beams 166 and 180 may be pulsed ON and OFF for very short periods of time, via timers 184 and 186 connected to the controller 162 and the respective beam interruption detection circuitry 152 and 170. Thus the ON time of each beam is intermittent to provide a duty cycle. Duty cycling provides a reduction in energy consumption.

In one example, a beam ON pulse occurs every 10 milliseconds. As a further modification, the beam 180 associated with the trunk may be pulsed ON at a lower rate than the beam 166 associated with the door because immediate access at the trunk need not be as critical. In one example, the beam 180 associated with the trunk is pulsed on every 100 milliseconds.

Figure 7:
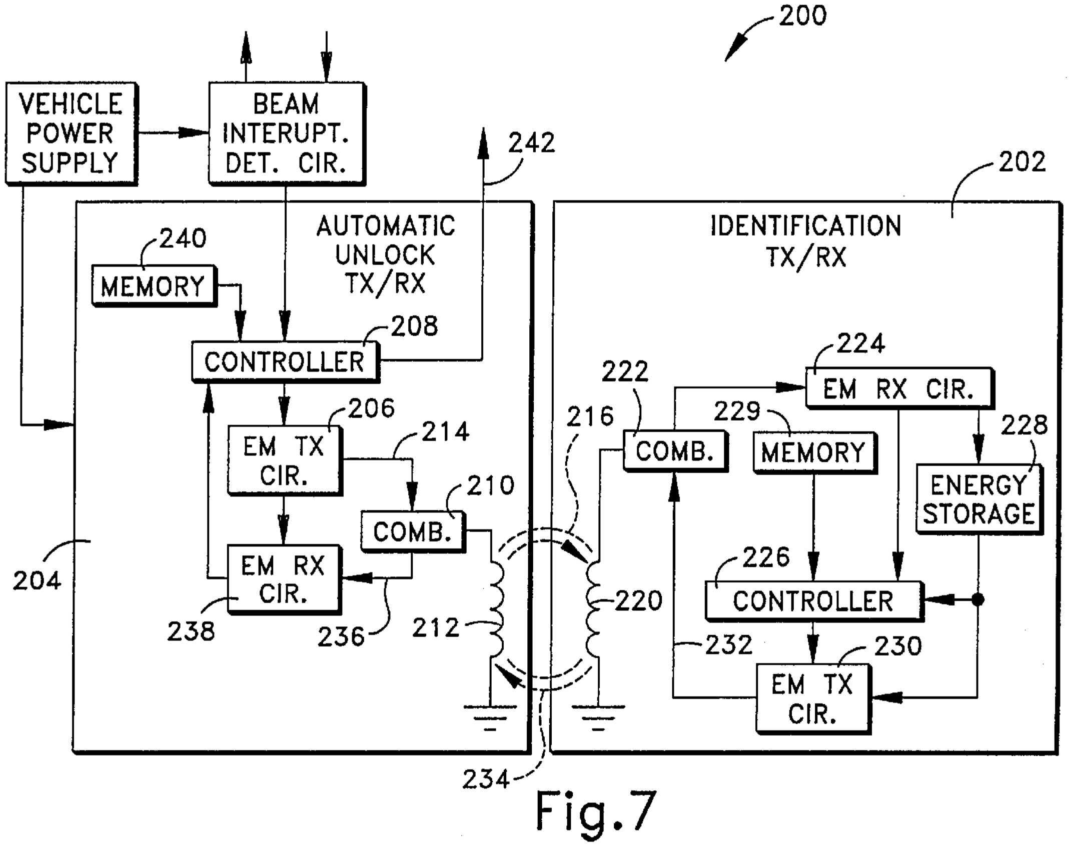
FIG. 7 is still another embodiment of the present invention.

Another embodiment in accordance with the present invention is shown in FIG. 7. In a system 200 shown in FIG. 7, an identification transceiver 202 does not include a battery energy source. Specifically, the identification transceiver 202 of FIG. 7 differs from the identification transceiver 36 of FIGS. 1–3 because the identification transceiver 36 of FIGS. 1–3 has a battery 80. For the system 200 of FIG. 7, energy is transferred to the identification transceiver 202 from an automatic unlock transceiver 204 via induction coupling.

The induction coupling occurs coincident with interrogation. In order to accomplish the induction coupling, the automatic unlock transceiver 204 of FIG. 7 defers from the automatic unlock transceiver 26 of FIGS. 1–3, in that the RF transceive circuitry 68 and antenna 72 are replaced by an electromagnetic (EM) transceive components. Specifically, EM transmit circuitry 206 (FIG. 7) is coupled to a controller 208 to receive the interrogation message request from the controller.

The EM transmit circuitry 206 is operatively connected to a combiner 210 and to an EM antenna coil 212. In response to an electrical signal 214 output from the EM transmit circuitry 206, the coil 212 outputs an EM interrogation signal 216. The interrogation signal 216 conveys the interrogation message and also provides energy in the form of a magnetic field.

The specific differences between the identification transceiver 202 of FIG. 7 and the identification transceiver 36 of FIGS. 1–3 include replacement of the RF transceive circuitry 78 and antenna 74 (FIG. 2) with EM transceive components. In the embodiment of FIG. 7, an EM antenna coil 220 is connected to a combiner 222. In turn, the combiner 222 is connected to EM receive circuitry 224. The EM receive circuitry 224 is coupled to a controller 226 and to an energy storage device 228 (e.g., a capacitor).

In response to the stimulus of the EM interrogation signal 216, the coil 220 output is provided, via the combiner 222, to the EM receive circuitry 224. The interrogation request message is provided by the EM receive circuitry 224 to the controller 226. Energy that is derived from the EM interrogation signal 216 is supplied to the energy storage device 228 from the EM receive circuitry 224.

The energy storage device 228 is operatively coupled to the controller 226 and also to EM transmit circuitry 230. When energized responsive to the stimulus of the interrogation request, the controller 226 accesses a memory 229 to retrieve a security code and provides a response message to the EM transmit circuitry 230. The EM transmit circuitry 230 conveys an electrical stimulus signal 232 to the coil 220 via the combiner 222. In response to the stimulus, the coil 220 outputs an EM response signal 234 that conveys the security code. In broad terms, the automatic unlock transceiver 204 and the identification transceiver 202 are a communication arrangement, with the EM interrogation signal 216 and the EM response signal 234 being the interrogation communication exchange.

In response to the stimulus of the EM response signal 234, the coil 212 at the automatic unlock transceiver 204 provides an electrical signal 236 to an EM receive circuitry 238 via the combiner 210. The signal 236 conveys the security code. The EM receive circuitry 238 provides the response message with the security code to the controller 208. Similar to the embodiment of FIGS. 1–3, when the controller 208 matches the security code with a code stored within a memory 240, the controller provides a signal 242 to unlock the vehicle door.

From the above description of the invention, those skilled in the art will perceive improvements, changes and modifications. For example, the unlocking action of a vehicle entrance cover (e.g., a trunk lid) may entail releasing a latch such that the authorized person need only open the cover (e.g., lift the trunk lid). Thus, there is no need to manually actuate a release latch. This modification is particularly useful for trunk lids. Such improvements, changes and modifications within the skill of the art are intended to be covered by the appended claims.

Having described the invention, the following is claimed:

1. An entry system for a vehicle that has at least one securable entrance, said system comprising:

a lockable entrance cover for closing the entrance to the vehicle;

interrogation communication means, having components at the vehicle and at an authorized person, operable for communicating and causing automatic lock release of said entrance cover in response to detection of associated components at said authorized person; and beam means for providing a continuous beam of energy transmitted from a first location and received at a second location and for causing operation of said communication means when the beam is interrupted, said beam means includes means for intermittently providing the continuous beam, said entrance cover is a first entrance cover, said beam means is a first beam means, and the continuous beam is a first continuous beam, said system including a second entrance cover for closing a second entrance to the vehicle, and a second beam means for providing a second continuous beam of energy and causing operation of said communication means when the second continuous beam is interrupted, said second beam means includes means for intermittently providing the second continuous beam at a rate that is different than a rate of intermittent provision of the first continuous beam.

2. A system as set forth in claim 1, wherein said first entrance cover includes a handle, said first beam means includes means for providing the first continuous beam at a location adjacent to said handle.

3. A system as set forth in claim 2, wherein said first beam means includes means for providing the first continuous beam at a location such that the continuous beam is interrupted by a hand of the authorized person as the authorized person reaches for the handle.

4. A system as set forth in claim 1, wherein said first beam means includes means for providing the first continuous beam transmitted from the first location and received at the second location as an infrared beam.

5. A system as set forth in claim 1, wherein said second beam means includes means for providing the second continuous beam of energy transmitted from a third location and received at a fourth location and causing operation of said communication means when the second continuous beam is interrupted.

6. A system as set forth in claim 5, wherein said communication means includes a first transceiver associated with the first beam means and a second transceiver associated with the second beam means.

7. A system as set forth in claim 6, wherein said first entrance cover is an entrance door for the person to enter the vehicle.

8. A system as set forth in claim 1, wherein said second entrance cover is a trunk lid.

9. A system as set forth in claim 1, wherein said communication means includes a plurality of transceivers that communicate via radio frequency signal.

10. A system as set forth in claim 1, wherein said interrogation communication means includes a plurality of transceivers, said transceivers communicate via exchange of electromagnetic energy, at least one of the transceivers transfers power to at least another of the transceivers via the electromagnetic energy exchange.

11. A system as set forth in claim 1, including means for intermittently powering said first beam means to provide a duty cycle.

12. A system as set forth in claim 1, wherein said first beam means includes a beam emitter for emitting an infrared beam and a beam receiver for detecting impingement of the infrared beam.

13. A system as set forth in claim 12, including means for fixing said beam emitter and said beam receiver to the vehicle such that the infrared beam is located to be interrupted when a hand of the person reaches to operate a handle.

14. A system as set forth in claim 12, wherein said means for fixing include means for positioning said beam emitter and said beam receiver to the vehicle such that the beam is located behind said handle relative to the person.

* * * * *